April 26, 1966  M. A. BROWN  3,248,582
SUBMERSIBLE MOTOR WITH DETACHABLE CAPACITOR AND HOUSING
Filed April 3, 1963
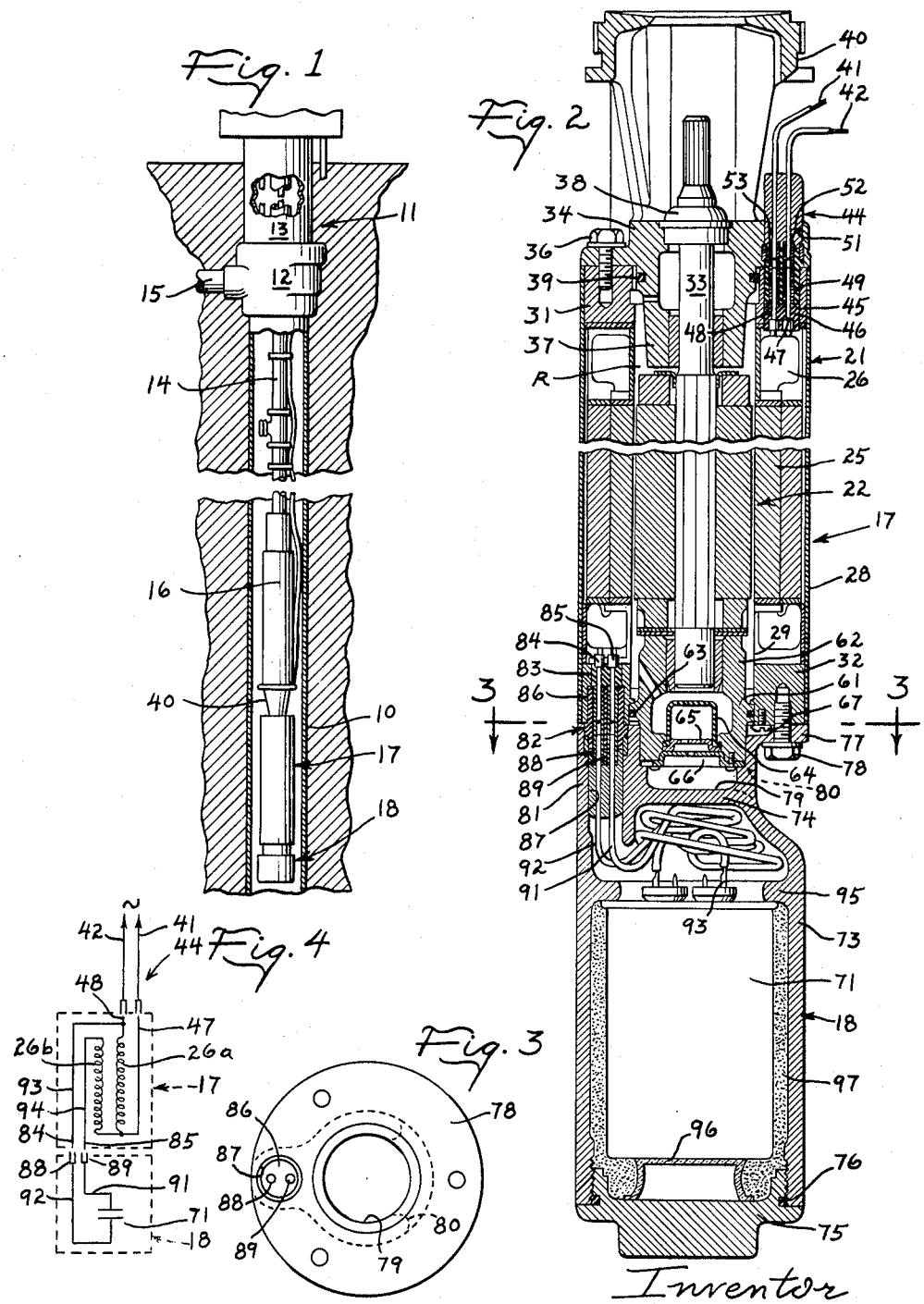
Inventor
Marvin A. Brown
By McCanna, Morsbach & Pillote
Atty's United States Patent Office 3,248,582
Patented Apr. 26, 1966

3,248,582
SUBMERSIBLE MOTOR WITH DETACHABLE
CAPACITOR AND HOUSING
Marvin A. Brown, Davenport, Iowa, assignor to Red
Jacket Manufacturing Company, Davenport, Iowa, a
corporation of Iowa
Filed Apr. 3, 1963, Ser. No. 270,283
4 Claims. (Cl. 310—87)

This invention relates to submersible electric motors for use in wells, storage tanks and the like.

In order to reduce the number of wires that must be extended to the well casing and also down the wall casing to the motor, and to additionally eliminate the necessity of providing a motor cut out switch, it has heretofore been proposed to use permanent split capacitor type motors for operating submersible pumps. The windings of the submersible motor, however, must be sealed from the liquid surrounding the motor to avoid shorts in the winding, and when the motor capacitor is located in the well at the motor, it is also necessary to insulate the motor capacitor from the surrounding liquid. In the prior submersible motors having the capacitor located at the motor, the motor capacitor has been positioned within the sealed motor enclosure and immersed in the insulating oil which fills the motor enclosures. In such constructions, replacement of the condenser requires opening of the motor enclosure and draining of the oil before the condenser can be removed and, conversely, the motor enclosure must be refilled with oil and then resealed after replacement of the condenser. Such constructions thus render replacement of the condenser a relatively difficult and time consuming operation.

An important object of this invention is to provide a submersible electric motor and motor capacitor unit in which the motor capacitor can be readily removed and replaced without necessitating opening of the motor enclosure or draining of the insulating oil from the motor.

A more particular object of this invention is to provide a submersible electric motor and motor capacitor unit in which the motor is housed in a sealed motor enclosure and the capacitor is housed in a separate sealed enclosure and wherein the capacitor enclosure is arranged so that it can be mechanically and electrically connected to and disconnected from the motor enclosure to thereby facilitate replacement of the motor capacitor in the field.

These, together with other objects and advantages of this invention will be more readily appreciated as the same becomes better understood by reference to the following detailed description when taken in connection with the accompanying drawings wherein:

FIG. 1 is a fragmentary vertical sectional view through a well having the improved motor-capacitor unit therein;

FIG. 2 is a vertical sectional view through the motor and capacitor unit;

FIG. 3 is an end elevational view of the condenser case taken on the plane 3—3 of FIG. 2; and FIG. 4 is a diagrammatic view illustrating the circuit for the motor-capacitor unit.

Referring first to FIG. 1, there is shown a well casing which extends from a point above the ground downwardly into the well opening in accordance with standard practice in encased wells. In the specific form shown, the well casing includes a conventional casing tube 10 which normally terminates at a point below the frost level in the ground. Attached to the upper end of the casing tube in a water tight manner is a pitless underground unit indicated generally by the numeral 11 and which customarily comprises a discharge head 12 and a casing extension 13 of somewhat greater inside diameter than the casing tube, and which casing extension extends to a point above the ground level. The discharge head 12 is preferably of the type having a removable packer unit (not shown) and which packer unit spans the discharge head and communicates a downwardly extending drop pipe 14 with a lateral discharge outlet 15 on the discharge head. The drop pipe 14 extends downwardly in the casing to the pump unit 16. A submersible electric motor 17 is attached to the pump to drive the same and, in accordance with the present invention, the motor is preferably of the permanent split capacitor type and has a motor capacitor unit 18 mounted and connected to the motor windings.

As shown in FIG. 2, the motor 17 includes a stator body 21 defining a rotor chamber R and a rotor 22 disposed in the stator body. The stator body comprises a laminated core structure 25 having motor windings 26, and which core and windings are disposed within an imperforate outer shell 28. The motor windings 26 are preferably sealed and, for this purpose, an inner tubular liner 29 is disposed within the core and ring members 31 and 32 are provided at opposite ends of the stator and sealed to the outer shell and to the liner to form a sealed enclosure for the stator windings. The rotor 22 is disposed in the stator and has a motor shaft 33 extending therefrom outwardly of the motor enclosure for connection to the pump 16. A motor end member 34 overlies the stator ring member 31 and is removably fastened thereto by bolts 36. The motor end member 34 also includes a bearing hub 37 which extends axially from one side of the motor end member into the rotor chamber R in the stator body 21. A shaft seal 38 is provided on the motor end member to seal the interface with the shaft 33, and the bearing hub 37 has an O-ring 39 which engages the ring member 31 to seal the upper end of the rotor chamber. A fitting 40 is mounted on or formed integrally with the upper end member 34 and is arranged for attachment to the pump unit 16 to mount the motor unit thereon.

A plug-in type electrical disconnect is provided on the upper end of the motor to enable disconnection of the power supply conductors 41 and 42 from the field windings in the motor. The plug-in type disconnect is advantageously constructed and arranged on the ring member 31 and end member 34 in the manner more fully disclosed and claimed in the copending application of Marvin Brown, Serial No. 181,334, now abandoned, filed March 21, 1962. In general, the plug-in disconnect 44 includes a bore 45 in the ring member 31, and which bore has an insulating body 46 mounted at its inner end and carrying electrical prongs 47 and 48. A second insulating body 49 is mounted in a stepped bore 51 in the end member 34 and carries socket members 52 and 53. The conductors 41 and 42 are connected to the socket members and the latter are arranged to interfit with the prongs 47 and 48 to electrically connect the conductors 41 and 42 to the prongs, when the end member is mounted on the ring member 31. While a particular plug-in connector construction has been illustrated, it is apparent that other constructions could be employed, if desired.

The other or lower end of the stator body is closed by an end member 61, which end member extends into the ring member 32 and carries a bearing hub 62 for rotatably supporting the lower end of the shaft 33. The lower end member 61 is sealed to the ring member 32 as by an O-ring 63 and the rotor chamber R is filled with an oil (not shown) having suitable insulating and lubricating characteristics. In order to accommodate thermal expansion and contraction of the oil, a movable wall or expansion chamber 64 is mounted on the end member 61 and has one side exposed to the fluid in the rotor chamber. The expansion chamber is retained in position on the end member 61 by retainer plates 65 and 66 and the end member 61 is detachably retained on the ring member 32 as by headed fasteners 67.

The windings 26 of the split capacitor type motor include a main winding designated 26a and an auxiliary winding designated 26b (see FIG. 4). As shown in that figure, the main winding 26a is connected to the prongs 47 and 48 of the plug-in disconnect 44 to have power supplied thereto from the power supply conductors 41 and 42. Auxiliary winding 26b is connected in series with a motor running capacitor 71, and across the prongs 47 and 48 of the plug-in disconnect 44. In accordance with the present invention, the motor running capacitor 71 is enclosed in a sealed condenser case which is separate from the motor enclosure and provision is made for mounting the case on the motor enclosure and for electricity connecting the capacitor to the auxiliary windings in the motor. The condenser case is conveniently in the form of a casting having a preferably generally annular configuration and including a side wall 73, an integral upper end wall 74 and a lower end wall 75. The lower end wall is advantageously in the form of a detachable cap which is threadedly received in the lower end of the side wall 73 and which is sealed thereto as by an O-ring 76. The condenser case has an outer diameter generally corresponding to the outer diameter of the motor and has a flange 77 at one end which is detachably secured as by fasteners 78 to the lower ring member 32 on the stator body. The condenser case overlies the lower end member 61 and the expansion chamber 64 therein, and has a cavity 79 which registers with the expansion chamber and which communicates through a lateral passage 80 with the fluid outside of the motor to equalize the pressures inside and outside the stator body. The condenser case has a boss at one side, and a second plug-in type electrical disconnect 82 is provided on the registering faces of the stator body and condenser case to electrically interconnect the auxiliary winding and the running capacitor 71. The plug-in electrical disconnect can have any suitable construction and as shown herein has the same general construction as the plug-in type disconnect 44. In general, the plug-in disconnect 82 includes a resilient body 83 disposed in a bore in the ring member 32, and which carries prongs 84 and 85. An interfitting plug member in the form of a resilient body 86 is mounted in a bore 87 in the boss 81 on the condenser case and carried socket members 88 and 89 arranged to interfit with the plug members 84 and 85 when the condenser case is mounted on the motor. As shown in FIG. 4, the socket members 88 and 89 are connected through conductors 91 and 92 to the motor running capacitor 71 and the prongs 84 and 85 are connected through conductors 93 and 94 to the auxiliary winding 26b and to the prong 48 leading to the conductor 42. The conductors 91 and 92 are made sufficiently long to extend from the prong to the lower end of the condenser case so that the condenser 71 can be removed and replaced and, when the condenser is positioned in the case, the conductors are folded as shown in FIG. 2. The wires may be connected to the capacitor 71 in any desired manner, as by prong type contacts 93. As shown in FIG. 2, the case has an inwardly extending shoulder 95 adjacent its upper end which forms a stop for the capacitor 71, and a resilient cup 96 is conveniently interposed between the removable cap 75 and the lower end of the capacitor to support the capacitor in the case. The case can completely be filled with an inert insulating material 97 such as sand, if desired.

From the foregoing, it is thought that the construction and operation of the device will be readily understood. Since the motor running capacitor is located directly on the motor, only two power supply conductors 41 and 42 are required to connect the submerged motor to the remote power supply. The motor capacitor is mounted directly on the motor, but externally of the motor enclosure and in a separate sealed enclosure in such a manner that the condenser case and the capacitor 71 can be readily attached to and removed from the motor without requiring opening of the motor enclosure and draining of the oil. The capacitor 71 can thus be readily replaced in the field by merely detaching the capacitor unit 18 from the motor to enable replacement of the capacitor 71 or installation of a new capacitor unit 18.

While I have illustrated and described the preferred form of construction for carrying the invention into effect, this is capable of variation and modification without departing from the spirit of the invention. I, therefore, do not wish to be limited to the precise details of contruction set forth, but desire to avail myself of such variations and modifications as come within the scope of the appended claims.

I claim:

1. A submersible motor apparatus comprising a motor unit and a motor-capacitor unit, said motor unit including a stator having an annular stator body and first and second end members on opposite ends of the stator body defining a sealed motor chamber therewith when the motor unit is disassembled from the motor-capacitor unit, a rotor in said motor chamber, a rotor shaft extending out of the motor chamber through one of said end members and having a running seal therewith, said stator body having motor windings and power supply connector means connected to said windings and extending out through the stator in sealed relation therewith, a liquid filling said motor chamber, said stator having an expansion chamber including a movable wall, one side of which communicates with the liquid in the motor chamber and the other side of which communicates with the fluid external of the motor unit, said capacitor unit including a case and means detachably securing the case to one end of the stator, said case defining a capacitor chamber sealed from said motor chamber, a motor capacitor in said capacitor chamber, and capacitor connecting means connected to the motor windings and extending out through the stator in sealed relation therewith and connected to said capacitor in said case, said capacitor connecting means including disconnect means external of said stator and separable to disconnect the capacitor from the motor windings without opening the motor chamber.

2. A submersible motor apparatus comprising a motor unit and a motor-capacitor unit, said motor unit including a stator having an annular stator body and first and second end members on opposite ends of the stator body defining a sealed motor chamber therewith when the motor unit is disassembled from the motor-capacitor unit, a rotor in said motor chamber, a rotor shaft extending out of the motor chamber through one of said end members and having a running seal therewith, said stator body having motor windings and power supply connector means connected to said windings and extending out through the stator in sealed relation therewith, a liquid filling said motor chamber, said stator having an expansion chamber including a movable wall, one side of which communicates with the liquid in the motor chamber and the other side of which communicates with the fluid external of the motor unit, said capacitor unit including a case and means detachably securing the case to one end of the stator, said case defining a capacitor chamber sealed from said motor chamber, a motor capacitor in said capacitor chamber, a plug-in type electrical disconnect including a first connector element mounted on said stator at the end adjacent said case in sealed relation to the stator and electrical connector means connecting said first connector element to motor windings, said disconnect including a second connector element mounted on the case at the end adjacent the motor unit and electrical connector means connecting the second element to the capacitor, said first and second connector elements having interfitting contacts on the registering faces of the stator and capacitor case respectively for electrically connecting the capacitor to the motor winding when the condenser case is attached to the stator and arranged to enable removal of the motor-capacitor unit from the motor unit without opening the motor chamber.

3. A submersible motor apparatus comprising a motor unit and a motor-capacitor unit, said motor unit including a stator having an annular stator body and first and second end members on opposite ends of the stator body defining a sealed motor chamber therewith when the motor unit is disassembled from the motor-capacitor unit, a rotor in said motor chamber, a rotor shaft extending out of the motor chamber through one of said end members and having a running seal therewith, said stator body having motor windings and power supply connector means connected to said windings and extending out through the stator in sealed relation therewith, a liquid filling said motor chamber, said stator having an expansion chamber including a movable wall, one side of which communicates with the liquid in the motor chamber and the other side of which communicates with the fluid external of the motor unit, said capacitor unit including a case defining an imperforate enclosure when disassembled from the motor unit, means detachably securing the case to the lower end of the stator to provide a capacitor chamber in the case sealed from said motor chamber, a plug-in type electrical disconnect including a first connector element mounted on said stator at the lower end adjacent said case in sealed relation to the stator and electrical connector means connecting said first connector element to said motor windings, said disconnect including a second connector element mounted on said case at the upper end adjacent the motor unit and electrical connector means detachably connecting said second connector to said capacitor, said first and second connector elements having interfitting contacts on the registering faces of the stator and capacitor case respectively for electrically connecting the capacitor to the motor windings when the condenser case is attached to the stator and arranged to enable removal of the motor capacitor unit from the motor unit without opening the motor chamber.

4. The combination of claim 3 wherein the expansion chamber is located at the lower end of the stator.

References Cited by the Examiner

UNITED STATES PATENTS

| | | | |
|---|---|---|---|
| 2,539,048 | 1/1951 | Arutunoff | 310—87 X |
| 2,944,297 | 7/1960 | Maynard | 310—87 X |
| 2,997,609 | 8/1961 | Lung | 310—87 |

ORIS L. RADER, *Primary Examiner.*

JOHN W. GIBBS, *Assistant Examiner.*